United States Patent
Cordes et al.

(10) Patent No.: US 7,810,033 B2
(45) Date of Patent: Oct. 5, 2010

(54) METHODS AND SYSTEMS INVOLVING TEXT ANALYSIS

(75) Inventors: Steven A Cordes, Yorktown Heights, NY (US); Debra A Loussedes, Clinton Corners, NY (US); Christopher E Obszarny, Wellington, FL (US); Patrick R Varekamp, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 11/931,108

(22) Filed: Oct. 31, 2007

(65) Prior Publication Data

US 2009/0112834 A1 Apr. 30, 2009

(51) Int. Cl.
G06F 17/30 (2006.01)
(52) U.S. Cl. ...................... 715/700; 715/706
(58) Field of Classification Search ................ 715/700, 715/706
See application file for complete search history.

(56) References Cited

U.S. PATENT DOCUMENTS

| 6,839,411 | B1 * | 1/2005 | Saltanov et al. | 379/88.13 |
| 6,975,712 | B1 * | 12/2005 | Schnarel et al. | 379/142.01 |
| 6,999,914 | B1 * | 2/2006 | Boerner et al. | 704/1 |
| 7,089,504 | B1 * | 8/2006 | Froloff | 715/839 |
| 7,136,080 | B1 * | 11/2006 | Kaminagayoshi et al. | 345/619 |
| 7,194,742 | B2 * | 3/2007 | Suzuki | 719/310 |
| 7,236,576 | B2 * | 6/2007 | Schnarel et al. | 379/142.01 |
| 7,284,202 | B1 * | 10/2007 | Zenith | 715/744 |
| 2002/0057285 | A1 * | 5/2002 | Nicholas, III | 345/700 |
| 2003/0214524 | A1 * | 11/2003 | Oka | 345/700 |
| 2004/0075675 | A1 * | 4/2004 | Raivisto et al. | 345/700 |
| 2004/0140989 | A1 * | 7/2004 | Papageorge | 345/700 |
| 2004/0172301 | A1 * | 9/2004 | Mihai et al. | 705/2 |
| 2005/0149869 | A1 * | 7/2005 | Kehr et al. | 715/700 |
| 2006/0129927 | A1 | 6/2006 | Matsukawa | |
| 2006/0271526 | A1 * | 11/2006 | Charnock et al. | 707/3 |
| 2006/0282503 | A1 | 12/2006 | Gwozdz | |
| 2007/0016861 | A1 * | 1/2007 | Salomaa et al. | 715/700 |
| 2008/0005051 | A1 * | 1/2008 | Turner et al. | 706/20 |
| 2008/0096533 | A1 * | 4/2008 | Manfredi et al. | 455/412.1 |

* cited by examiner

*Primary Examiner*—Don Wong
*Assistant Examiner*—Kim T Nguyen
(74) *Attorney, Agent, or Firm*—Cantor Colburn LLP; Wenjie Li (57) ABSTRACT

An exemplary method for determining emotive tone in text, the method comprising, matching text in a text file with text entries in a control file database, wherein the formatting attributes include textual and non-textual indicators, receiving a first set of emotive values associated with the matching text entries from the control file database, calculating an emotive score with the first set of emotive values, assigning the emotive score to the text file, and displaying the emotive score of the text file.

13 Claims, 7 Drawing Sheets

| From | Subject | Emotive Score |
|---|---|---|
| John Doe | Meeting | 😐 |
| Joe Smith | Wed. Dinner | +25 |
| Pat Blue | Car repair |  |
| Meg Johnson | Test results | Very Pleased! |

402 — From column
404 — Subject column
406 — Emotive Score column
408 — emoticon
410 — slider
412 — +25
414 — Very Pleased!

METHODS AND SYSTEMS INVOLVING TEXT ANALYSIS

BACKGROUND OF THE INVENTION

1. Field of the Invention

This invention relates generally to a method and system for analyzing and determining emotive tones in text.

2. Description of Background

Textual communications often include a variety of words and phrases that convey a variety of thoughts. Often it is desirable for authors of the communications to understand the emotional or tonal aspect of the written text.

SUMMARY OF THE INVENTION

The shortcomings of the prior art are overcome and additional advantages are achieved through an exemplary method for determining emotive tone in text, the method comprising, matching text in a text file with text entries in a control file database, wherein the formatting attributes include textual and non-textual indicators, receiving a first set of emotive values associated with the matching text entries from the control file database, calculating an emotive score with the first set of emotive values, assigning the emotive score to the text file, and displaying the emotive score of the text file.

An alternate exemplary method for displaying emotive tone in text files including receiving a first text file, wherein the first text file includes an associated identifier and an emotive score, receiving a second text file, wherein the second text file includes an associated identifier and an emotive score, displaying the associated identifier and the emotive score of the first text file, and displaying the associated identifier and the emotive score of the second text file.

An exemplary embodiment of a system for determining and displaying emotive tone in text, comprising, a control file database including a plurality of text entries having corresponding emotive values, wherein the control file database is configurable by a user, and a processor operative to receive a first input, wherein the first input is a first text file including an associated identifier, the processor further configured to match text in the first text file with text entries in the control file database, receive a first set of emotive values corresponding with the matching text entries from the control file database, calculate an emotive score with the first set of emotive values, assign the emotive score to the first text file, and output the emotive score of the first text file and the associated identifier of the first text file to a display.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Systems and methods involving determining and displaying emotive values of text are provided.

Text is often used in communications including, for example email, word processing, and text messaging. Often, a recipient misunderstands an emotive tone intended by the sender for conveyance in the text. Since emotive tone is a component of personal communication, it is desirable that a sender and recipient fully understand the emotive tone of the message before the message is sent and when the message is received. Additionally, it is desirable that a recipient who receives a number of messages be able to sort the messages based on the emotive tone of the messages.

Figure 3:
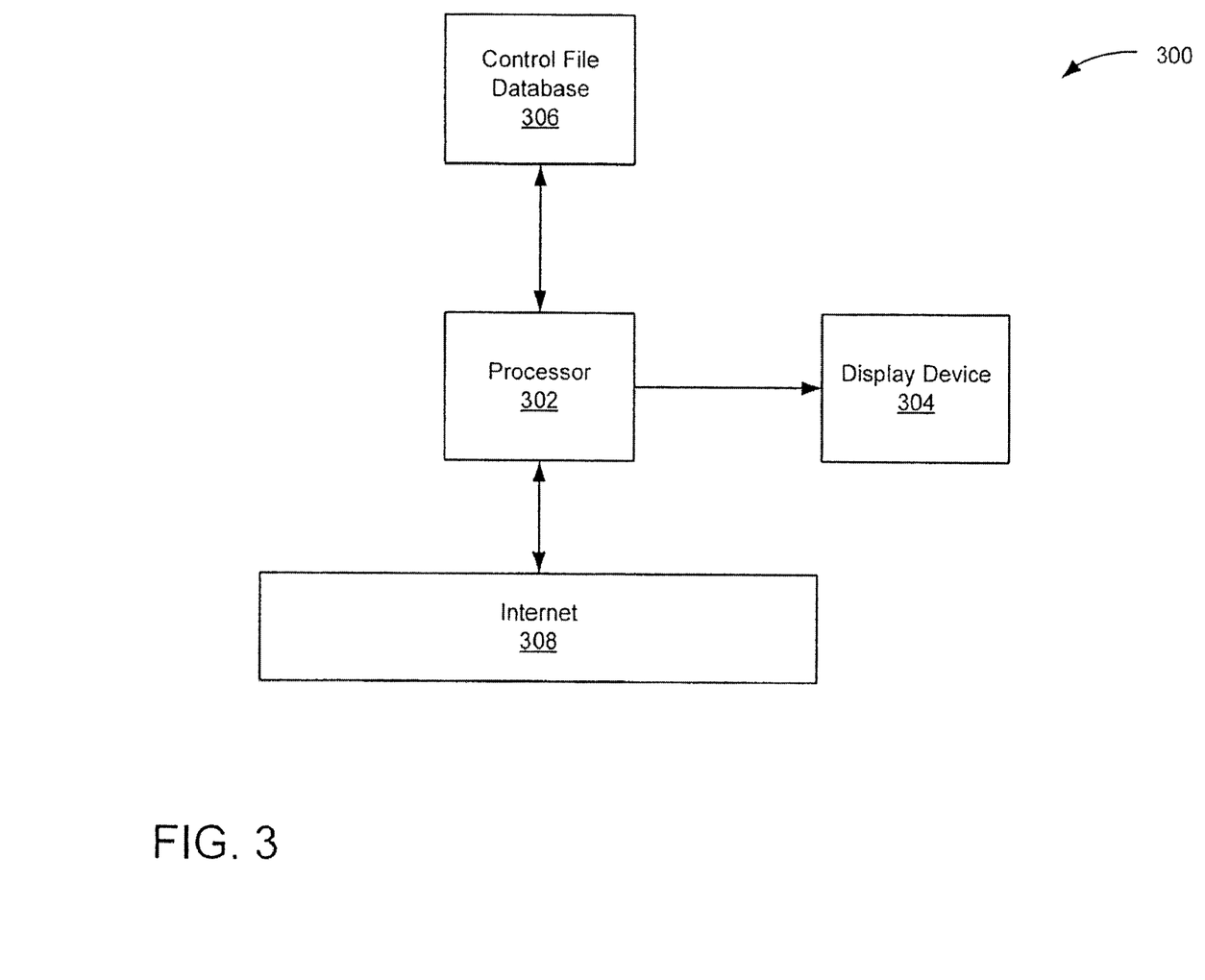
FIG. 3 illustrates an exemplary embodiment of a system for determining and displaying emotive values of text.

In this regard, FIG. 3 illustrates a schematic representation of an exemplary embodiment of a computer system 300, including a processor 302 communicatively linked to a control file database 306, a display 304 and a communications link such as the Internet 308.

Figure 1A:
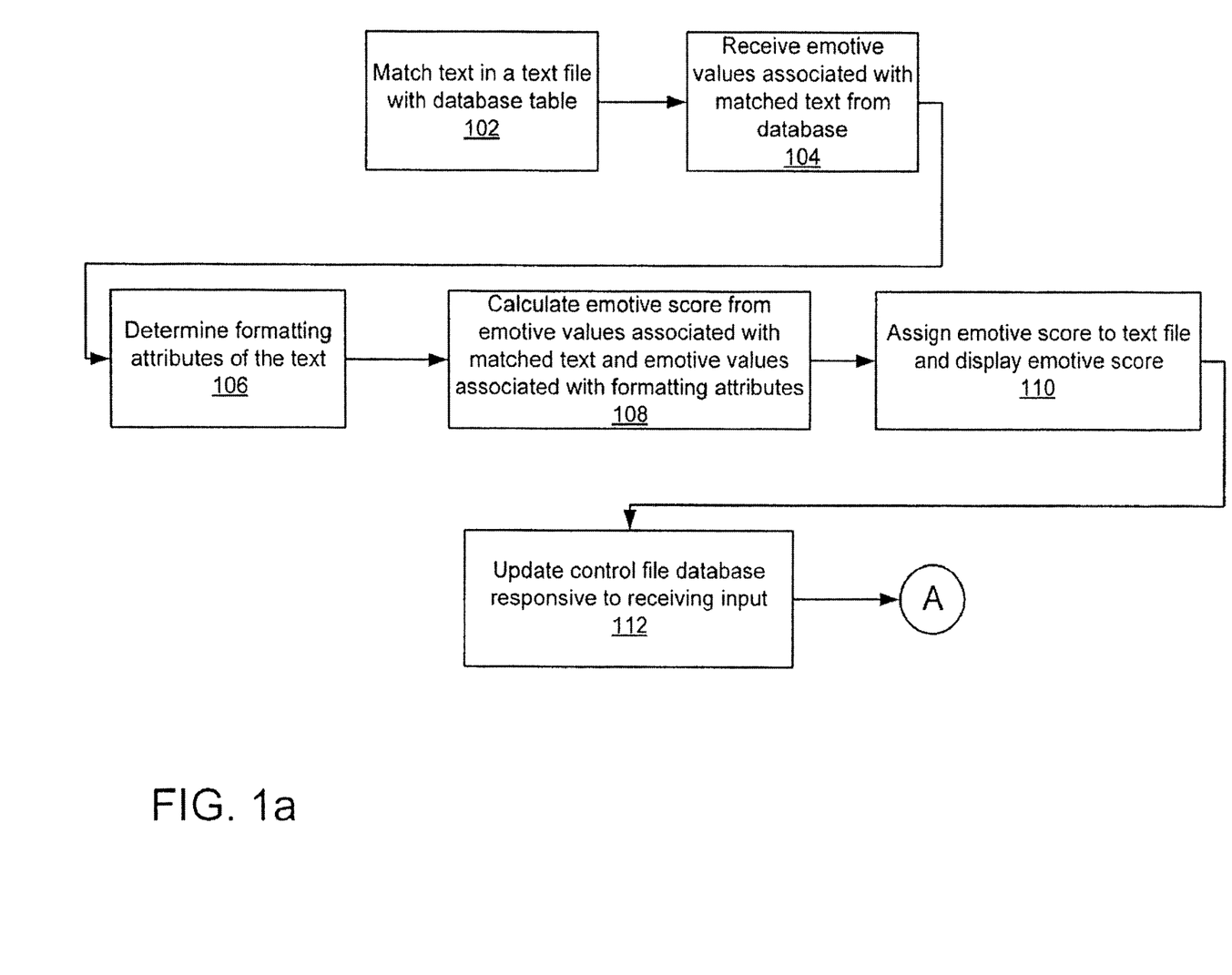
FIGS. 1a-1b illustrate an exemplary method for determining an emotive value of text.
Figure 1B:
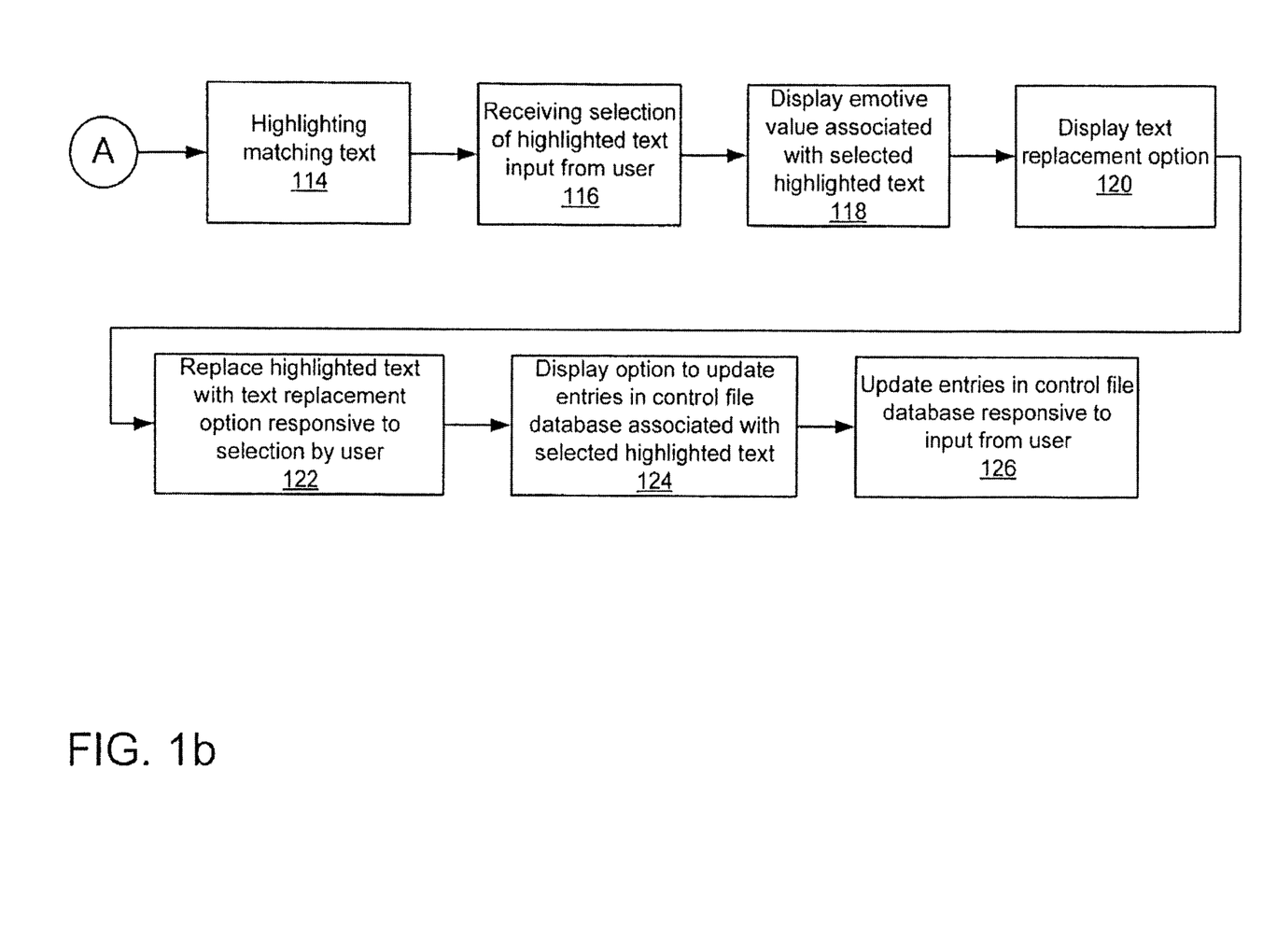

FIGS. 1a-1b illustrate a flow diagram of an example of an operation of the system in FIG. 3. Beginning in box 102 in FIG. 1a, the processor 302 (shown in FIG. 3) matches the text in a text file with text in the control file database 306. The text in the control file database 306 includes, for example, a table including a plurality of words, phrases, sentences, and punctuation. Each of the entries in the control file database 306 are associated with a particular emotive value. The control file database 306 may be updated by a user. The updates may include edits to data in the control file database 306, deletion of entries and the addition of entries. After the text in the text file has been matched to the text in the control file database 306, the processor 302 receives each of the emotive values of the matched text in block 104. The processor 302 may also determine emotive values based on formatting attributes of the text such as, for example, underlined text, bold text, and capitalized text in FIG. 106. Once all of the emotive values of the text have been determined, the processor 302 calculates an emotive score in block 108. The emotive score may be calculated using a number of methods such as, for example, adding the emotive values, taking a weighted average of the emotive values, and averaging the emotive values. In block 110, the emotive score is assigned to the text file and is displayed. In block 112, a user may update the control file database 306 by adding, deleting, and editing control file database 306 data.

The flow diagram of FIG. 1a continues in FIG. 1b at circle A. FIG. 1b illustrates a method for actively determining the emotive values of text in a text file. The illustrated method may be implemented while the text is being entered in the text file, or after the entry of text into the file is complete. Beginning with block 114, the processor 302 highlights the matched text and the determined formatting attributes of the text. In block 116, the processor receives a first input from the user that may include selecting a highlighted text portion with, for example, an input device such as a mouse. In block 118, the emotive value associated with the selected highlighted text portion is displayed. A text replacement option may also be displayed responsive to selecting the highlighted text portion in block 120. A text replacement option may include, for example, alternate words associated with the highlighted text portion in the control file database 306 having different emotive values and alternate formatting attributes that may be applied to the highlighted text portion that would result in a different emotive value for the highlighted text portion. The displayed text replacement option may also indicate the resultant emotive value subject to the replacement of the highlighted text portion with the text replacement option. In block 122, the processor 302 replaces the highlighted text portion with the text replacement option responsive to the user selecting the text replacement option.

In block 124, a second option may be displayed with or after the text replacement option is displayed. The second option includes the option to update entries in the control file database 306 that are associated with the highlighted text portion. In block 126, the processor 302 updates the control file database 306 responsive to receiving an input from the user. Updates may include, for example, designating the entries in the control file database 306 that are associated with the highlighted text portion to be ignored when the processor 302 is matching text and changing the emotive value of the associated entries.

Figure 6:
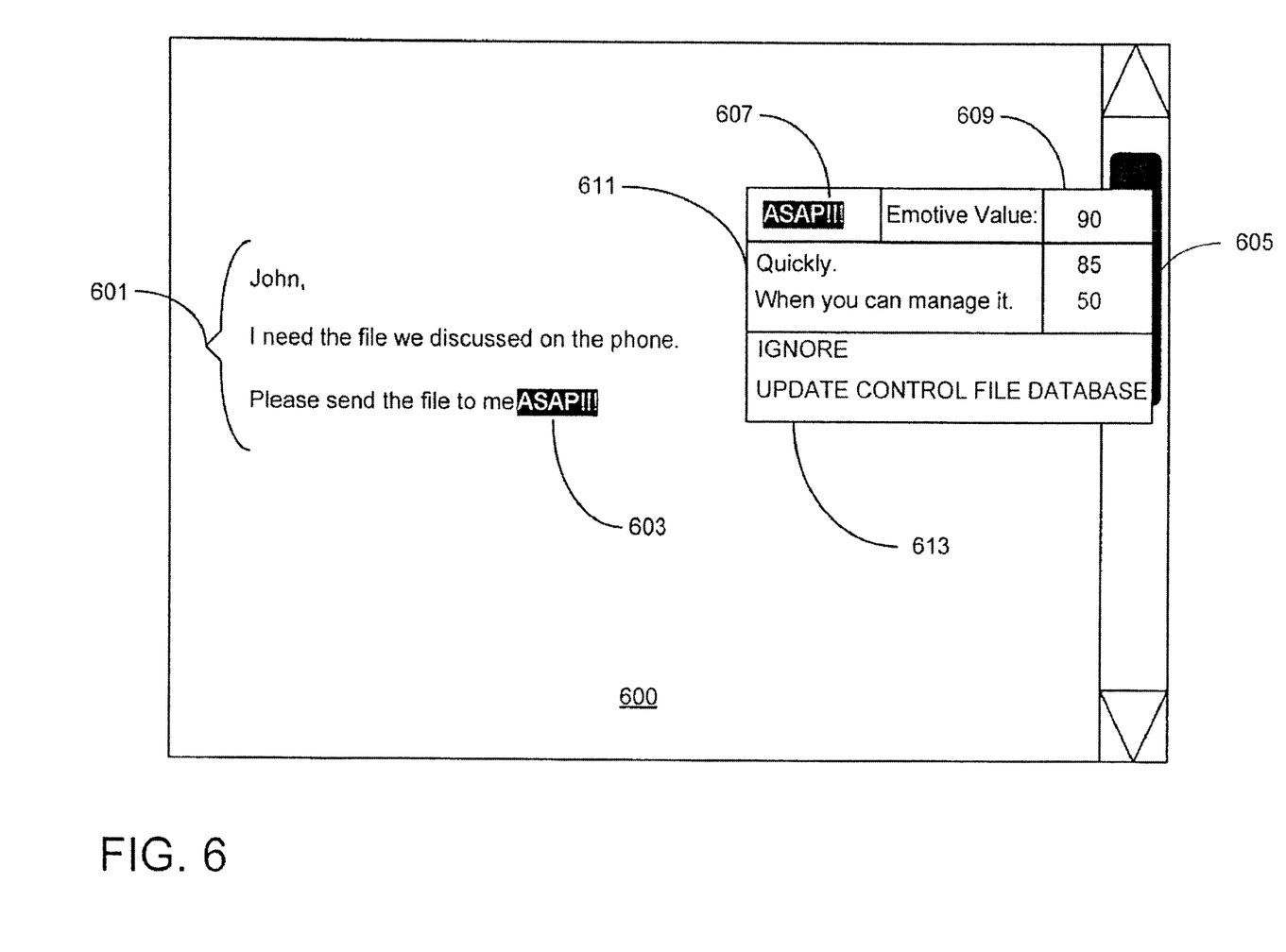
FIG. 6 illustrates an exemplary embodiment of an output from a system for determining and displaying emotive values of text.

FIG. 6 illustrates an exemplary embodiment of a graphical output including aspects of the method illustrated in FIGS. 1a-1b. In this regard, referring to FIG. 6, text 601 has been entered in a text box 600. While the text was entered, or after the text has been entered, the processor 306 has highlighted the matched text portion 603 "ASAP!!!". Upon the selection of the matched text portion 603, a box 605 is displayed that contains the matched text portion 603 "ASAP!!!" in a selected text box 607 and the emotive value corresponding to "ASAP!!!", in this example "90" in an emotive value column 609. Text replacement options are listed in a text replacement option box 611 with the corresponding emotive values of the text replacement options also listed in the emotive score column 609. The options to ignore the matched text portion 603 and the option to edit the control file database 306 are displayed in an options box 613. A user may select one of the text replacement options thereby directing the processor 302 to replace the matched text portion 603 with the selected text replacement option. Additionally, a user may select "IGNORE" that will direct the processor 302 to not highlight any text that matches the matched text portion 603. When selected, the option to allow a user to update the control file database 306 may direct a user to enter control file database 306 updates.

Figure 2:
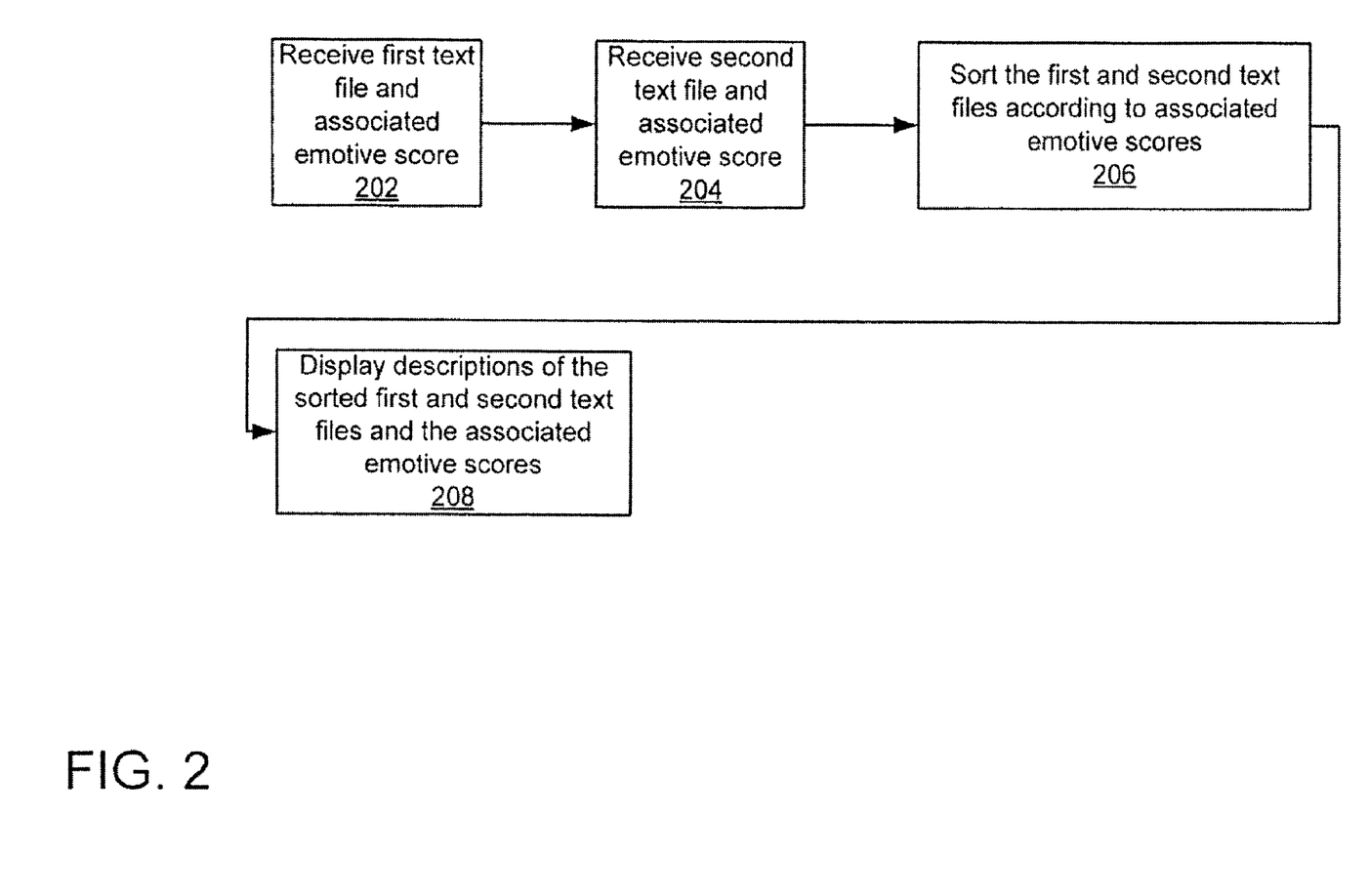
FIG. 2 illustrates an exemplary method for displaying emotive values of text.

FIG. 2 illustrates an example of alternate method that may be performed by the system 300. In the method of FIG. 2, beginning in block 202 the processor 302 receives a first text file with an associated emotive score and a description. The description may include, for example, a subject of the text file, the author of the text file, or portions of the text file. In block 204 the processor 302 receives a second text file with an associated emotive score. The processor 302 in block 206 sorts the first text file and the second text file according to the emotive scores of the text files. In block 208, the processor 302 sends sorted the descriptions and the emotive scores of the text files to the display 304.

Figure 4:
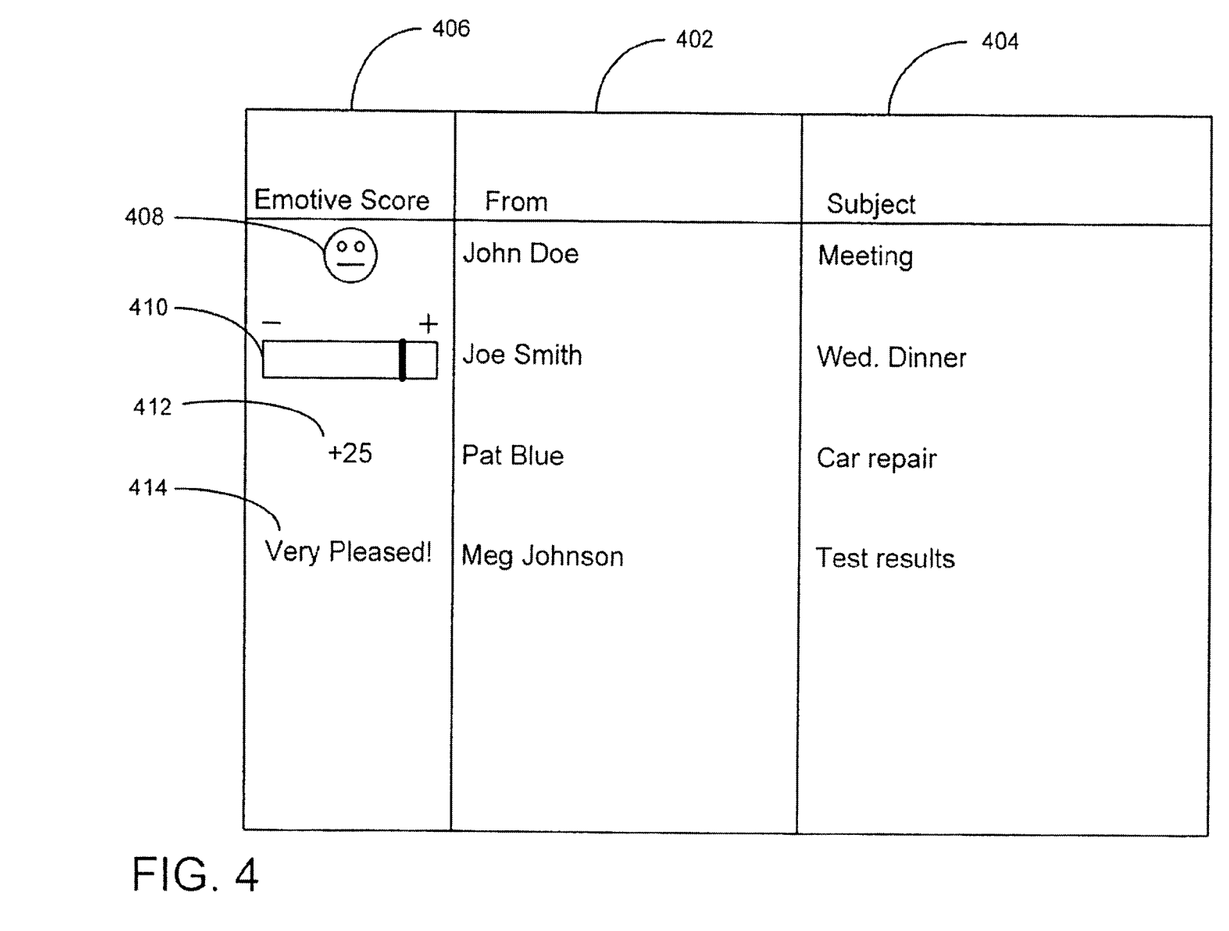
FIG. 4 illustrates an exemplary embodiment of an output from a system for determining and displaying emotive values of text.

FIG. 4 illustrates an exemplary embodiment of a graphical display that includes the emotive values of text files. Referring to FIG. 4, the graphical display is divided into columns including, a from column 402 that includes the authors and senders of text files, a subject column 404 that includes the subjects of text files, and an emotive score column 406 that includes textual and non-textual representations of the text files. The face icon 408 is an example of a visual indication of an emotive score for a text file from John Doe. Other types of face icons may be used to indicate the emotive score of the text file from John Doe. A sliding bar 410 is another exemplary embodiment of a non-textual representation of an emotive score. The sliding bar 410 indicates the emotive score of the text file by moving the bar closer or farther to minus and plus signs. The actual emotive score 412 of the text file from Pat Blue is illustrated in the emotive score 406 column. The emotive score may also be represented by words 414 such as "Very Pleased!". The emotive score may be configurable by a user, such that a user may designate what type of visual indicator is used to indicate emotive scores.

Figure 5:
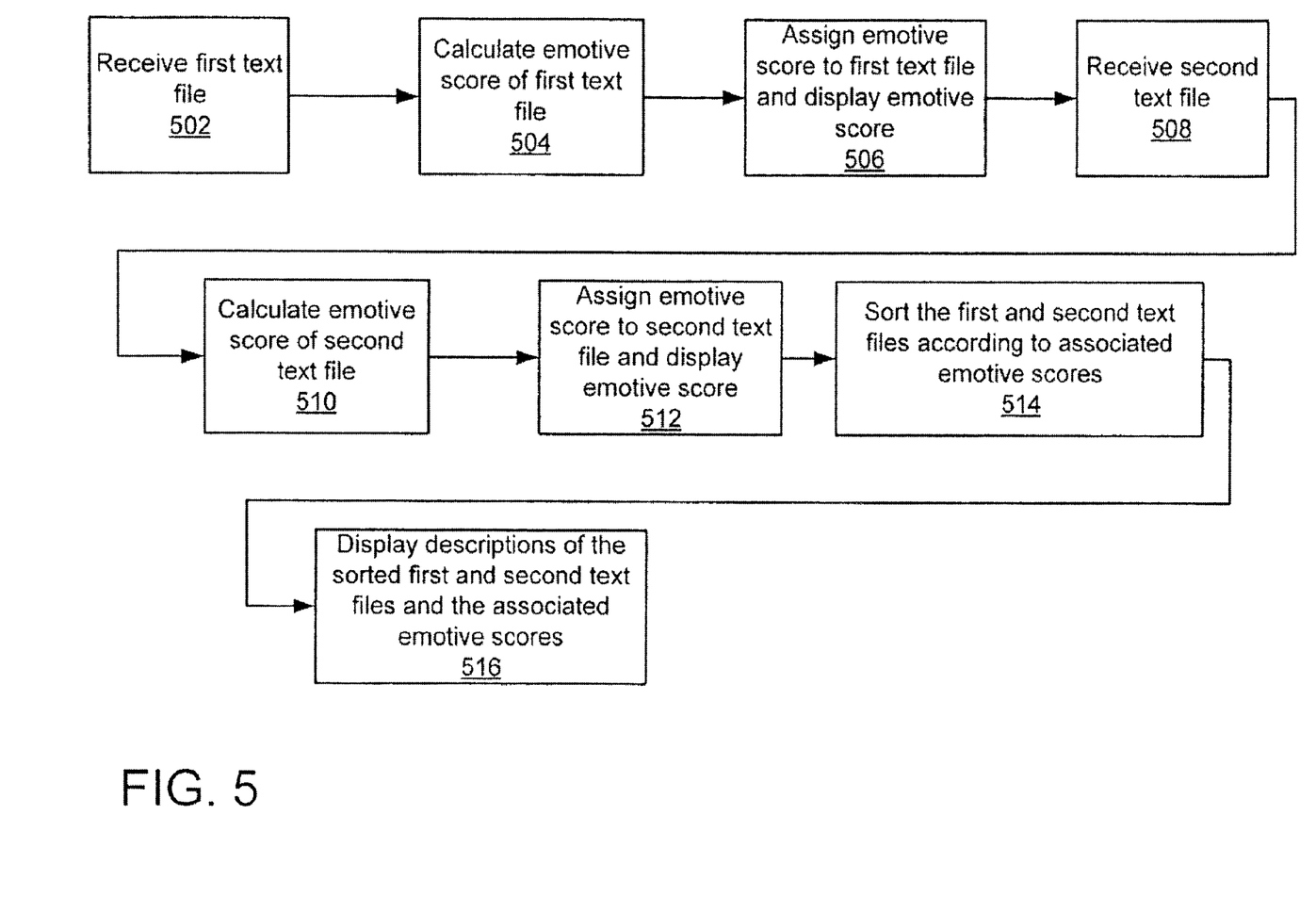
FIG. 5 illustrates an exemplary method for determining and displaying emotive values of text.

FIG. 5 illustrates an example of an alternate embodiment of a method for determining and displaying emotive scores of text files. In the embodiment in FIG. 5, the system 300 may receive text files that do not include emotive scores, determine and assign emotive scores of the received text, and sort and display the emotive scores with an indicator associated with the text file. In this regard, the processor 302 receives a first text file in block 502, and calculates an emotive score for the first text file in block 504. In block 506 the emotive score is assigned to the first text file, and may be displayed. Block 508 includes the processor 302 receiving a second text file. The emotive score of the second text file is calculated in block 510 and assigned to the second text file in block 512. In block 514 the first and second text files are sorted according to the assigned emotive scores. In block 516, the text files are displayed indexed by the assigned emotive scores.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for determining emotive tone in text, the method comprising:
matching text in a text file with text entries in a control file database, wherein formatting attributes include textual and non-textual indicators;
receiving a first set of emotive values associated with the matching text entries from the control file database;
calculating an emotive score with the first set of emotive values;
assigning the emotive score to the text file;
displaying the emotive score of the text file;
determining formatting attributes of the text by:
associating a second set of emotive values stored in the control file database with the determined formatting attributes of the text;
calculating an updated emotive score with the first set of emotive values and the second set of emotive values;
updating the assigned emotive score of the text file;
displaying the emotive score of the text file;
highlighting the matching text and the determined formatting attributes of the text;
receiving a first input from a user, wherein the first input includes selecting a highlighted text portion;

displaying the emotive value associated with the selected highlighted text portion responsive to receiving the first input from the user;

displaying a text replacement option associated with the selected highlighted text portion, wherein the associated text replacement option is stored in the control file database;

replacing the selected highlighted text portion with the text replacement option responsive to receiving a second input from the user, wherein the second input includes selecting the text replacement option;

displaying a second option, wherein the second option includes updating entries in the control file database associated with the selected highlighted text portion; and updating the entries in the control file database associated with the selected highlighted text portion responsive receiving a third input from the user, wherein the third input includes selecting the second option.

2. The method of claim 1, the method further comprising receiving control file database updates from a user, wherein the control file database updates include adding, deleting, and editing control file database data.

3. The method of claim 1, the method further comprising:

associating the emotive score of the text file with a visual indicator, wherein the visual indicator is configurable by a user; and displaying the associated visual indicator.

4. A method for displaying emotive tone in text files, the method comprising:

receiving a first text file, wherein the first text file includes an associated identifier and an emotive score;

receiving a second text file, wherein the second text file includes an associated identifier and an emotive score;

displaying the associated identifier and the emotive score of the first text file; and displaying the associated identifier and the emotive score of the second text file; and sorting the displayed associated identifier and the emotive score of the first text file and the associated identifier and the emotive score of the second text file according to the emotive scores of the first text file and the second text file.

5. The method of claim 4, the method further comprising:

associating the emotive score of the first text file and the emotive score of the second text file with visual indicators corresponding to values of the emotive scores; and displaying the associated visual indicators.

6. A method for determining emotive tone in text, the method comprising:

receiving a first text file, wherein the first text file includes an associated identifier;

determining an emotive score of the first text file from emotive values of text in the first text file and emotive values of formatting attributes of the text in the first text file;

assigning the emotive score to the first text file;

displaying the emotive score of the first text file and the associated identifier;

receiving a second text file, wherein the second text file includes an associated identifier;

determining an emotive score of the second text file from emotive values of text in the second text file and emotive values of formatting attributes of the text in the second text file;

assigning the emotive score to the second text file;

displaying the emotive score of the second text file and the associated identifier; and sorting the displayed associated identifier and the emotive score of the first text file and the associated identifier and the emotive score of the second text file according to the emotive scores of the first text file and the second text file.

7. The method of claim 6, the method further comprising:

associating the emotive score of the first text file and the emotive score of the second text file with visual indicators corresponding to values of the emotive scores; and displaying the associated visual indicators.

8. A system for determining and displaying emotive tone in text, comprising:

a control file database including a plurality of text entries having corresponding emotive values, wherein the control file database is configurable by a user; and a processor operative to receive a first input, wherein the first input is a first text file including an associated identifier, the processor further configured to match text in the first text file with text entries in the control file database, receive a first set of emotive values corresponding with the matching text entries from the control file database, calculate an emotive score with the first set of emotive values, assign the emotive score to the first text file, output the emotive score of the first text file and the associated identifier of the first text file to a display, determine formatting attributes of the first text file, the formatting attributes including textual and non-textual indicators, associate a second set of emotive values with the determined formatting attributes of the text file, calculate an updated emotive score with the first set of emotive values and the second set of emotive values, update the assigned emotive score of the first text file, and display the emotive score of the first text file, highlight the matching text and the determined formatting attributes of the text, receive a first input from a user, wherein the first input includes selecting a highlighted text portion, display the emotive value associated with the selected highlighted text portion responsive to receiving the first input from the user, display a text replacement option associated with the selected highlighted text portion, wherein the associated text replacement option is stored in the control file database, replace the selected highlighted text portion with the text replacement option responsive to receiving a second input from the user, wherein the second input includes selecting the text replacement option, display a second option, wherein the second option includes updating entries in the control file database associated with the selected highlighted text portion, update the entries in the control file database associated with the selected highlighted text portion responsive receiving a third input from the user, wherein the third input includes selecting the second option.

9. The system of claim 8, wherein the processor is further operative to associate the emotive score of the first text file with a visual indicator, and display the associated visual indicator.

10. The system of claim 8, wherein the processor is further operative to receive a second input, wherein the second input is a second text file including an associated identifier, the processor further configured to match text in the second text file with text entries in the control file database, receive a third set of emotive values corresponding with the matching text entries from the control file database, calculate an emotive score of the second text file with the third set of emotive values, assign the emotive score to the second text file, and output the emotive score of the second text file and the associated identifier of the second text file to the display.

11. The system of claim 10, wherein the processor is further operative to determine formatting attributes of the second text file, associate a fourth set of emotive values with the determined formatting attributes of the second text file, calculate an updated emotive score with the third set of emotive values and the fourth set of emotive values, update the assigned emotive score of the second text file, and display the emotive score of the second text file.

12. The system of claim 10, wherein the processor is further operative to associate the emotive score of the second text file with a visual indicator, and display the associated visual indicator.

13. The system of claim 11, wherein the processor is further operative to sort the displayed associated identifier and the emotive score of the first text file and the associated identifier and the emotive score of the second text file according to the emotive scores of the first text file and the second text file.

* * * * *